Dec. 30, 1924. 1,521,085
J. ESTRADE
ANCHOR CARRIAGE AND LIKE VEHICLE
Filed Jan. 4, 1919   3 Sheets-Sheet 1
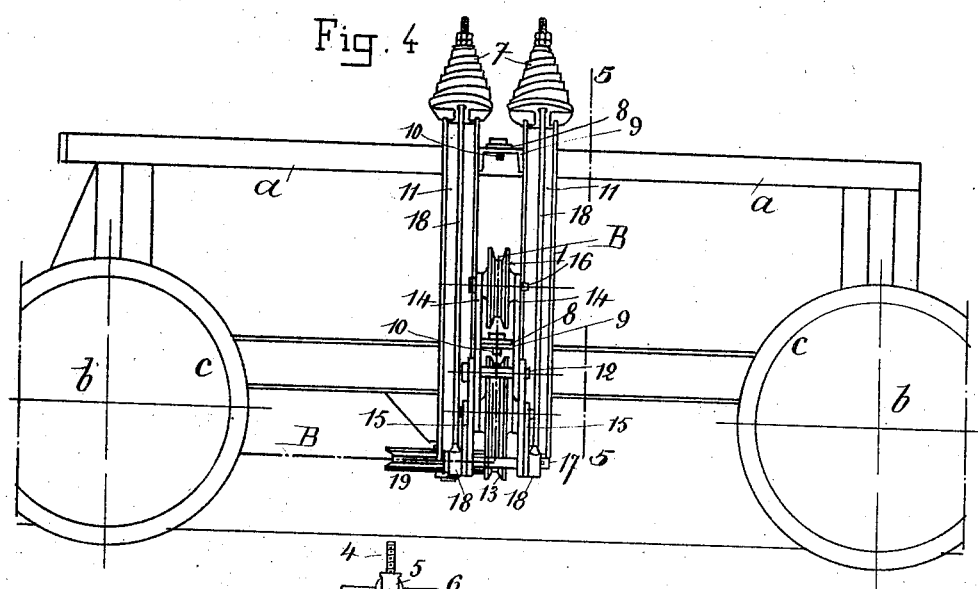
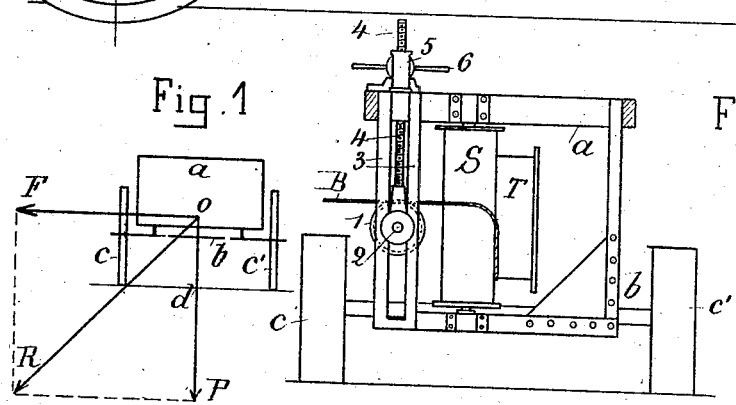
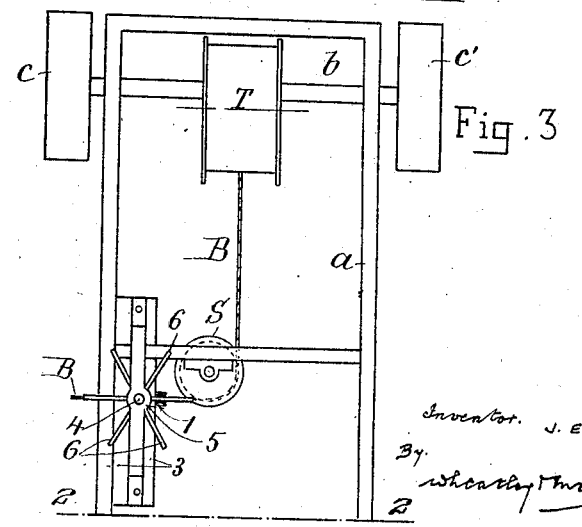
Inventor. J. ESTRADE.

Dec. 30, 1924.
J. ESTRADE
1,521,085
ANCHOR CARRIAGE AND LIKE VEHICLE
Filed Jan. 4, 1919   3 Sheets-Sheet 2
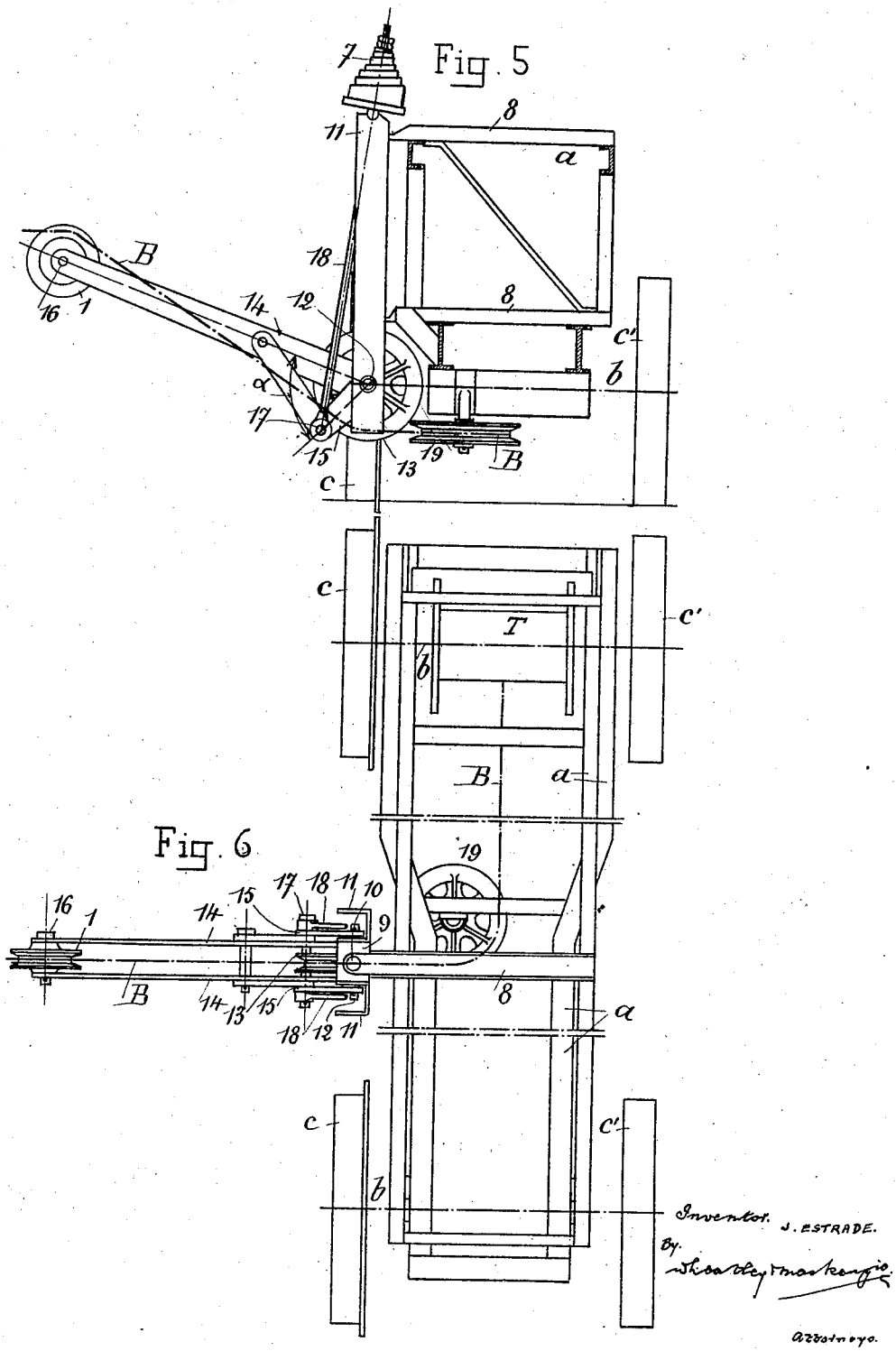

Dec. 30, 1924.
J. ESTRADE
1,521,085
ANCHOR CARRIAGE AND LIKE VEHICLE
Filed Jan. 4, 1919    3 Sheets-Sheet 3
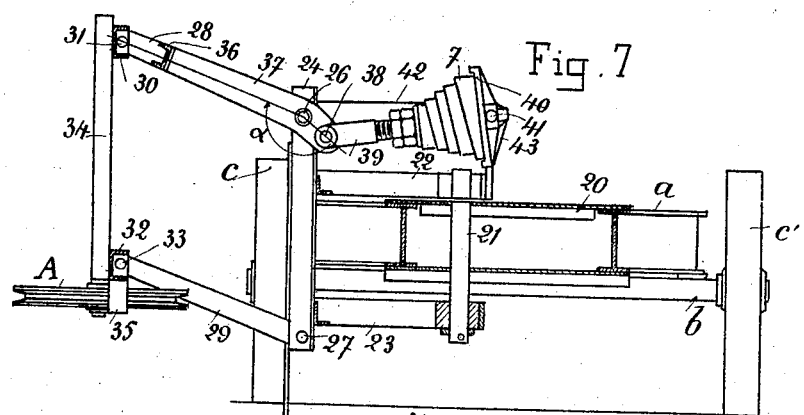
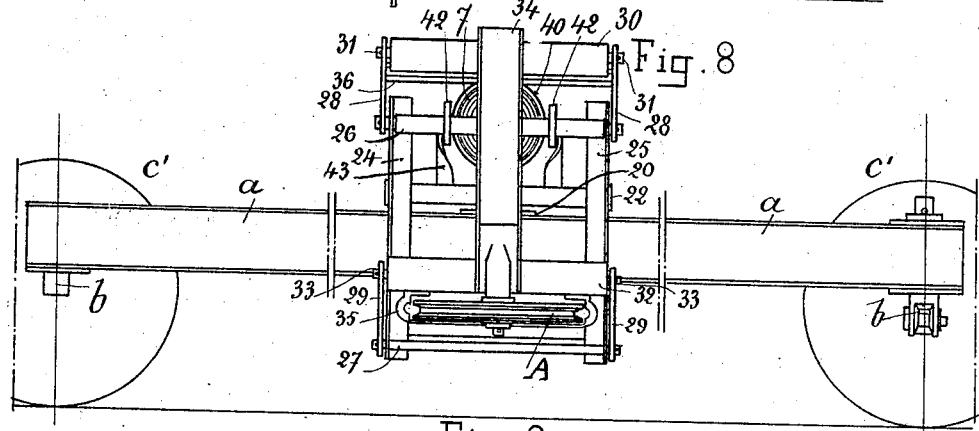
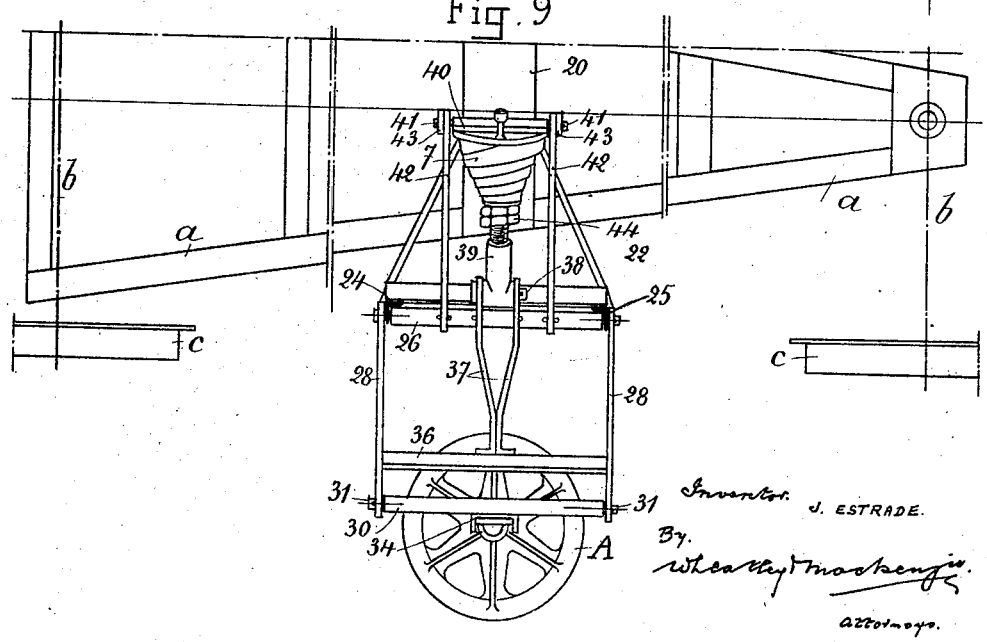

Patented Dec. 30, 1924.

1,521,085

UNITED STATES PATENT OFFICE.

JOACHIM ESTRADE, OF CARCASSONNE, FRANCE.

ANCHOR CARRIAGE AND LIKE VEHICLE.

Application filed January 4, 1919. Serial No. 269,720.

*To all whom it may concern:*

Be it known that JOACHIM ESTRADE, a citizen of the French Republic, residing at 2 Avenue Arthur-Mullot, Carcassonne, Aude, France, has invented certain new and useful Improvements in Anchor Carriages and like Vehicles (for which I have filed an application in France October 4, 1917, Patent No. 487,045), of which the following is a specification.

This invention relates to the anchoring carriages or vehicles employed in apparatus used in husbandry, which are subjected to the action of traction cables, and its object is an arrangement ensuring a maximum adhesion to the soil for a certain weight of the vehicle. This arrangement comprises devices by means of which it is possible to vary by hand or automatically the height of the point where the tractional action of the cable is applied, that is to say the height of the roller over which the cable runs, so that the resultant of this action and of the weight of the vehicle passes as near as possible to an edge in its base of support without leaving that base. The automatic regulation of the height of the roller utilizes partially or totally the tractional action so as to bring the roller near the soil, an antagonistic spring tending to keep it away therefrom when the tractional action is reduced.

In the accompanying drawings—

Fig. 1 is a diagram illustrating the equilibrium of forces of a vehicle under the action of the cable traction F.

Figs. 2 and 3 illustrate an anchorage vehicle supporting a windlass furnished with a device for regulating by hand the height of the point where the tractional action is applied. Fig. 2 is a vertical section of the vehicle taken through 2—2 (Fig. 3) and Fig. 3 is a plan of a portion of the vehicle in the part provided with the windlass for the cable and with the regulating device.

Figs. 4 to 9 illustrate two arrangements effecting the automatic regulating of the height of the roller. In Figs. 4 to 6 the arrangement partially utilizes the tractional action applied to a simple agricultural windlass. In Figs. 7 to 9 the arrangement utilizes the tractional action of the cable applied to a vehicle carrying a guide-pulley.

Fig. 4 is a longitudinal elevation of a vehicle furnished with a windlass T provided with the automatic regulating device.

Fig. 5 is a vertical section through 5—5 Fig. 4.

Fig. 6 is a plan, the antagonistic springs being removed.

Fig. 7 is a vertical section of a vehicle carrying a guide pulley A provided with the regulating device.

Fig. 8 is a longitudinal elevation of the said vehicle, the two front wheels being removed.

Fig. 9 represents in plan the half of the part of the vehicle which supports the arrangement.

In the various figures $a$ indicates the vehicle $b$ the axles carried by the two pairs of wheels $c\ c$; in Fig. 1 $o$ indicates the point of application of the tractional action F represented by the line $o$ F. P is the weight of the vehicle represented by the line $o$ P and $o\ d$ is the height of the point of application of the tractional action above the soil. The resultant $o$ R of the tractional action F of the cable and the weight P of the vehicle should pass as near as possible to the vehicle wheels $c$ without leaving the path of the vehicle.

In its application to windlasses and to the anchorage vehicles employed in mechanical husbandry this arrangement causes the whole of their weight to bear on the wheels $c$ placed at the side of the traction and thus to effect the fullest extent of anchoring of these vehicles in the soil.

In Figs. 2 and 3 the traction cable B that is wound on the windlass T, after running on to a guide pulley S, passes over a roller 1 mounted on a shaft 2 which is guided in vertical guides 3 attached to the frame $a$. The shaft of the roller is firmly conected with a screw rod 4 that moves between the slides 3. A nut 5 fitted on to this rod and which is rotated by arms 6 enables the roller 1 and the cable B which it bears to be raised or lowered and consequently the height of the point of application of the tractional action F, the resultant of the tractional action and of the weight of the vehicle then passing as near as possible to the point of contact of the wheel $c$ with the ground.

Instead of being applied to a vehicle provided with a windlass, the arrangement may be applied to a vehicle with return cables or to any other apparatus that has to resist a tractional action.

In Figs. 4 to 6 the arrangement automatically regulates the height of the roller 1 in relation to the ground, partially ultilizing the tractional action of the cable B applied to a simple agricultural windlass T, antagonistic springs tending to keep the roller 1 from the ground when the tractional action is reduced.

Cross bars 8 borne by the frame a of the vehicle support the arrangement by means of the iron rods 9, the fixing being effected through two pivots 10 which enable it to move according to the direction of the cable B. The principal uprights 11 connected through the iron bars 9 are traversed in the lower part by the shaft 12 which supports the grooved pulley 13 and a two-arm lever 14, 15. The end of the long arm 14 of this lever carries a horizontal shaft 16 on which the roller 1 turns. The other arm 15 of the lever carries in its lower part another shaft 17 to which are attached two rods 18 which through the medium of regulating nuts and counter nuts bear against two springs 7 placed on the top of uprights 11.

The cable B coming from the windlass T passes over the pulley to a vertical shaft 19 under the pulley 13 and over the roller 1 borne by the lever 14, 15. The cable B, the general direction of which is horizontal, will be likewise raised, but it is forced to pass into the lower groove of the pulley 13.

The tractional strains that are borne by the two ends of the cable passing over the roller 1 are compounded, producing a resultant strain which will tend to lower the roller 1. This strain, having regard to the angle formed by the two ends of the cable, will be only a part of the tractional strain borne by the cable. This action will cause a lowering towards the ground of the roller 1 and of the lever 14, 15, the extent of this lowering being regulated by the resistance of the springs 7 firmly connected with the said lever through the rods 18. The regulating of this extent, effected by proper choice of the angle $\alpha$ and the initial compression of the springs 7 must be such that the equilibrium of the vehicle is maintained whatever may be the extent of the tractional strain on the cable B.

The arrangement, Figs. 4 to 6 may be applied to a vehicle with return cable instead of a carriage-windlass. In this case each of the ends of the cable are wound on a single pulley with vertical shaft fixed to the frame of the vehicle and pass over a device similar to that illustrated in Figs. 4 to 6. The pivots of each of the two devices allow of their following the direction of the cable end which guides them.

Figs. 7 to 9 illustrate the preferred from of the invention, wherein the arrangement automatically regulates the height of the guide pulley A in relation to the ground, utilizing the total tractional strain of the cable B applied to the vehicle a bearing that pulley.

On the frame of the vehicle crossbars 20 are fixed. These have a hole drilled in them into which a pivot 21 enters on which the arrangement is mounted. The ties or bands 22, 23 support two uprights 24, 25 traversed by two shafts 26, 27 around which pivot the two rods 28, 29 all of equal length. The two rods 28 placed on the shaft 26 end at a cross bar 30 furnished with two pins 31. The two rods 29 placed on the shaft 27 end at another crossbar 32 furnished with two pins 33. These two crossbars are united by the upright 34 which keeps their pins at a distance apart equal to that of the shafts 26 and 27. A flexibly jointed parallelogram is thus obtained, its four points being formed by the shafts 26, 27, and the pins 31, 33. The upright 34 will thus remain vertical in all cases provided that the two uprights or mounts 24 and 25 remain vertical. The upright 34 carries in its lower part a grooved pulley A into which the cable runs. The piece 35 serves as guard for keeping the cable B in the groove.

The two rods 28 are connected by a crossbar 36 on which are fixed two firmly connected levers 37 pivoting around the shaft 26 and carrying a shaft 38 on which is mounted the compression rod 39 of the spring 7 that bears against the plate 40 the two pins 41 of which are supported by the pieces 42 and 43. The initial compression of the spring 7 is regulated by the nuts 44.

When the cable B passing over the pulley A acts tractionally, the parallelogram tends to assume the form of a rectangle. The rods 28, 29 thus oscillate, actuating the levers 37 which compresses the spring 7.

The position of the shaft 38 in relation to the direction of the rod, represented by the angle $\alpha$, is determined so that the compression of the spring 7 allows the pulley A to descend to the extent necessary for maintaining the equilibrium of the vehicle, whatever the tractional strain may be.

The pivot 21 enables the device to place itself at all times in the bisector of the angle formed by the two cable ends passing over the pulley A and prevents any warping of the apparatus.

I claim:—

1. An anchor carriage for use in cable traction systems for cultivating land by mechanical power, comprising a vehicle body with supporting axles and wheels, cable traction means associated with said anchor carriage, and means whereby the height of the point where the tractional stress of the cable is applied to the vehicle can be varied in accordance with the magnitude of the tractional stress in said cable.

2. An anchor carriage for use in cable traction systems for cultivating land by mechanical power comprising a vehicle body with supporting axles and wheels, cable traction means associated with said anchor carriage, a guide pulley on the vehicle adapted to guide the cable to or from the vehicle, and means for varying the height of said pulley in such manner that for all tractional stresses the resultant of force set up by the component forces corresponding to the cable stress and the weight of the vehicle passes as nearly as possible through the edge of the wheel base without leaving said base.

3. An anchor carriage for use in cable traction systems for cultivating land by mechanical power comprising a vehicle body with supporting axles and wheels, cable traction means associated with said anchor carriage, a guide pulley on the vehicle adapted to guide the cable to or from the vehicle, and means for varying the height of said pulley in such manner that for all tractional stresses the resultant force set up by the component forces corresponding to the cable stress and the weight of the vehicle passes as nearly as possible through the edge of the wheel base without leaving the said base, said means comprising a lever with arms of unequal length the longer of which is arranged to support the guide pulley a horizontal shaft pivotally supporting said lever, and adjustable spring means arranged to act on the shorter lever arm and adapted to raise the pulley as the traction strain on the cable is reduced.

4. An anchor carriage for use in cable traction systems for cultivating land by mechanical power comprising a vehicle body with supporting axles and wheels, cable traction means associated with said anchor carriage, a guide pulley on the vehicle adapted to guide the cable to or from the vehicle, and means for varying the height of said pulley in such manner that for all tractional stresses the resultant force set up by the component forces corresponding to the cable stress and the weight of the vehicle passes as nearly as possible through the edge of the wheel base without leaving the said base, said means comprising a parallelogram frame mounted on a vertical pivot on the vehicle and comprising spaced vertical members and pairs of upper and lower inclined arms connecting said vertical members, one vertical member being adapted to support the guide pulley at its lower end, ties connecting said pivot to two vertical members of the parallel frame, transverse shafts mounted on the vertical members and forming upper and lower pivots for the arms of the frame, a cross bar connecting the two upper arms, a bent lever with long and short arms pivotally supported on the upper transverse shaft between the two upper arms of the parallelogram frame and connected by its longer arm with the cross bar, and a compression spring attached to the short arm of the bent lever and tending to raise the pulley as the tractional strain on the cable is reduced.

In testimony whereof he has affixed his signature, in presence of two witnesses.

JOACHIM ESTRADE.

Witnesses:
ALBERT MAULEXULT,
JOHN F. SIMONS.